(12) United States Patent
Jamadagni et al.

(10) Patent No.: US 10,015,798 B2
(45) Date of Patent: Jul. 3, 2018

(54) METHOD AND SYSTEM FOR MANAGING CO-CHANNEL INTERFERENCE ON A TRAFFIC CHANNEL

(71) Applicant: Samsung Electronics Co., Ltd., Gyeonggi-do (KR)

(72) Inventors: Satish Nanjunda Swamy Jamadagni, Bangalore (IN); Radhakrishnan Saahithyan, Bangalore (IN); Pradeep Krishnamurthy Hirisave, Bangalore (IN); Sarvesha Anegundi Ganapathi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 14/370,759

(22) PCT Filed: Jan. 7, 2013

(86) PCT No.: PCT/KR2013/000103
§ 371 (c)(1),
(2) Date: Jul. 3, 2014

(87) PCT Pub. No.: WO2013/103279
PCT Pub. Date: Jul. 11, 2013

(65) Prior Publication Data
US 2015/0003270 A1 Jan. 1, 2015

(30) Foreign Application Priority Data
Jan. 5, 2012 (IN) .............................. 65/CHE/2012

(51) Int. Cl.
*H04W 72/08* (2009.01)
*H04W 16/10* (2009.01)
(Continued)

(52) U.S. Cl.
CPC ......... *H04W 72/082* (2013.01); *H04W 16/10* (2013.01); *H04W 24/02* (2013.01);
(Continued)

(58) Field of Classification Search
CPC ..... H04W 16/10; H04W 24/08; H04W 24/10; H04W 72/082; H04W 24/02; H04W 72/1231
(Continued)

(56) References Cited

U.S. PATENT DOCUMENTS 6,515,980 B1 * 2/2003 Bottomley ........... H04B 1/7105
370/328
7,813,457 B2 10/2010 Krupka
(Continued)

FOREIGN PATENT DOCUMENTS

EP 1311093 A1 5/2003
EP 1929683 A1 6/2008
WO WO 2011162656 A1 * 12/2011 .......... H04W 72/082

OTHER PUBLICATIONS

3GPP, "LTE: Evolved Universal Terrestrial Radio Access (E-UTRA); Requirements for support of radio resource management", Apr. 2010, ETSI, 3GPP TS 36.133 version 9,3,0 Release 9, pp. 100-102.*
(Continued)

*Primary Examiner* — Un C Cho
*Assistant Examiner* — Shah Rahman

(57) ABSTRACT

The present invention provides a method and system for managing co-channel interference on a traffic channel. In one embodiment, a serving cell provides a list of scrambling codes associated with a plurality of neighboring cells to user equipment currently being served by the serving cell. The user equipment receives a scrambling code transmitted by at least one neighboring cell on a traffic channel in a search
(Continued)

frame. The user equipment descrambles the received scrambling code and evaluates signal strength of the at least one neighboring cell based on the output of the descrambled scrambling code. Then, the user equipment determines whether there is a co-channel interference from the at least one neighboring cell based on the evaluated signal strength, and wherein the at least one user equipment reporting existence of the co-channel interference from the at least one neighboring cell to a serving cell.

20 Claims, 7 Drawing Sheets

(51) Int. Cl.
    *H04W 24/02* (2009.01)
    *H04W 72/12* (2009.01)
    *H04W 24/10* (2009.01)
    *H04W 24/08* (2009.01)
(52) U.S. Cl.
    CPC ............ *H04W 24/08* (2013.01); *H04W 24/10* (2013.01); *H04W 72/1231* (2013.01)
(58) Field of Classification Search
    USPC .......................................................... 370/252
    See application file for complete search history.

(56) References Cited

U.S. PATENT DOCUMENTS

| | | | |
|---|---|---|---|
| 8,064,857 B2 | 11/2011 | Jaisimha et al. | |
| 2004/0176039 A1 | 9/2004 | Leyh et al. | |
| 2005/0272375 A1* | 12/2005 | Ramesh | H04B 17/318 455/67.11 |
| 2007/0074242 A1* | 3/2007 | Wang | H04K 1/00 725/31 |
| 2007/0141990 A1* | 6/2007 | Zeng | H04L 1/20 455/63.1 |
| 2007/0149242 A1 | 6/2007 | Kim et al. | |
| 2008/0189970 A1* | 8/2008 | Wang | H04W 36/0055 33/701 |
| 2009/0011765 A1* | 1/2009 | Inoue | H04J 13/16 455/436 |
| 2009/0303891 A1* | 12/2009 | Lucas | H04W 36/0083 370/252 |
| 2010/0246435 A1* | 9/2010 | Nguyen | H04W 8/005 370/254 |
| 2010/0272004 A1* | 10/2010 | Maeda | H04L 5/0007 370/312 |
| 2010/0278063 A1* | 11/2010 | Kim | H04L 5/0073 370/252 |
| 2011/0092220 A1* | 4/2011 | Bernini | H04W 16/04 455/452.2 |
| 2011/0149769 A1* | 6/2011 | Nagaraja | H04W 52/12 370/252 |
| 2011/0170482 A1* | 7/2011 | Dhanda | H04L 5/0048 370/328 |
| 2011/0319025 A1* | 12/2011 | Siomina | H04B 7/024 455/63.1 |
| 2011/0319122 A1* | 12/2011 | Zhou | H04W 52/146 455/522 |
| 2012/0082047 A1* | 4/2012 | Wu | H04W 72/082 370/252 |
| 2013/0039194 A1* | 2/2013 | Siomina | H04W 52/244 370/252 |
| 2013/0225188 A1* | 8/2013 | Seo | H04J 11/005 455/450 |

OTHER PUBLICATIONS

3GPP, "LTE; Evolved Universal Terrestrial Radio Access (E-UTRA); Requirements for support of radio resource management", Apr. 2010, ETSI, TS 36 133 V9.3.0 Release 9, pp. 100-105.*
3GPP, "LTE; Evolved Universal Terrestrial Radio Access (E-UTRA); Requirements for support of radio resource management (3GPP TS 36.133 version 9.3.0 Release 9)", Apr. 2010, ETSI, ETSI TS 136 133 V9.3.0 (Apr. 2010), pp. all.*
International Search Report dated Apr. 30, 2013 in connection with International Patent Application No. PCT/KR2013/000103, 3 pages.
Written Opinion of International Searching Authority dated Apr. 30, 2013 in connection with International Patent Application No. PCT/KR2013/000103, 4 pages.

* cited by examiner

[Fig. 1]
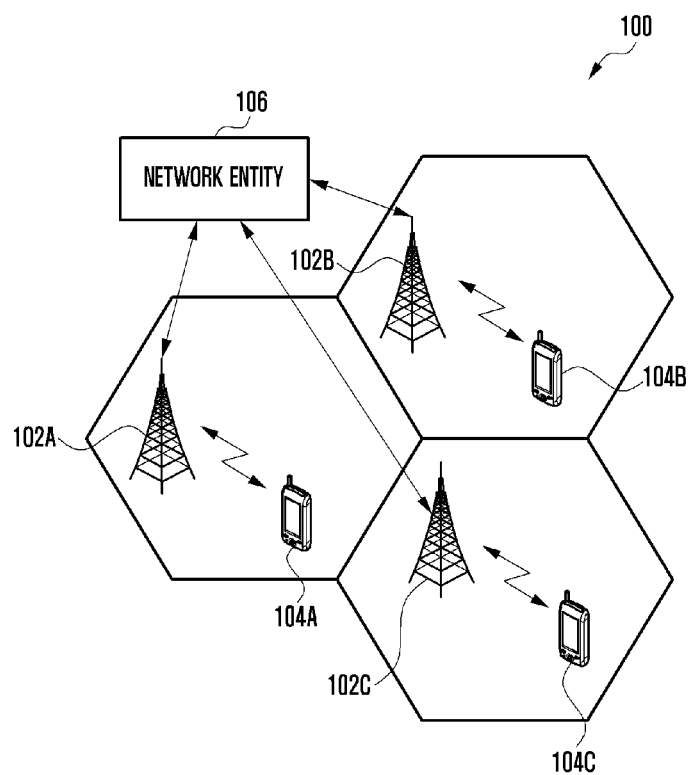

[Fig. 2]
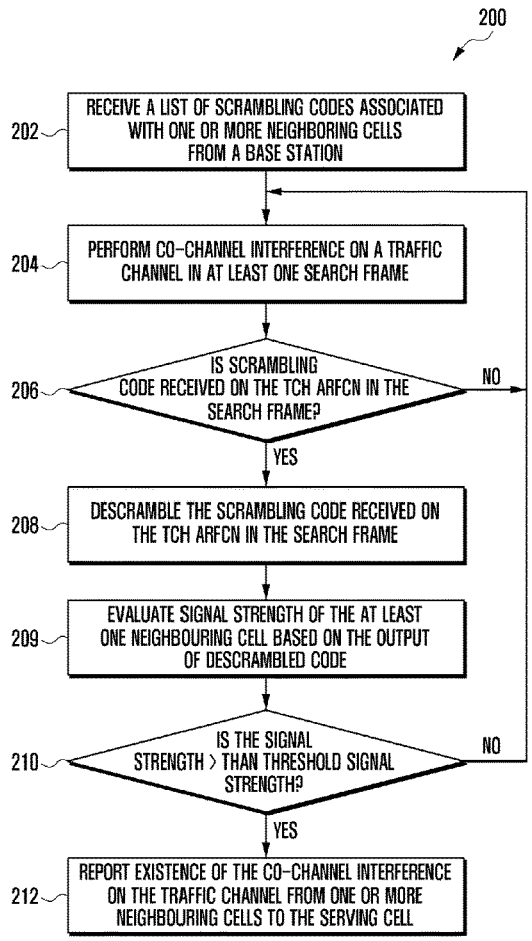
[Fig. 3]
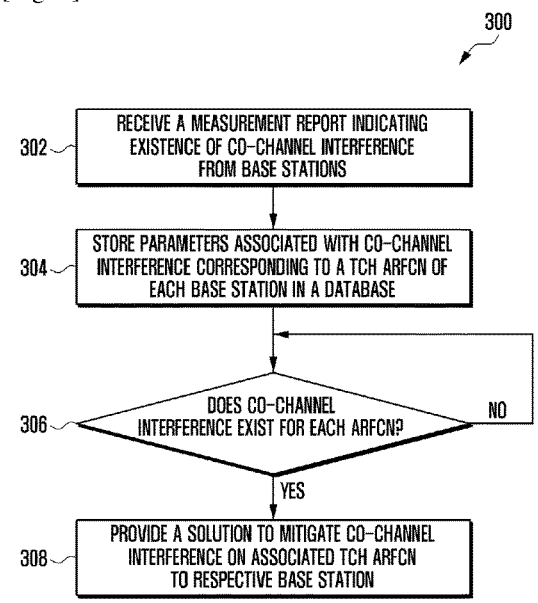

[Fig. 4a]
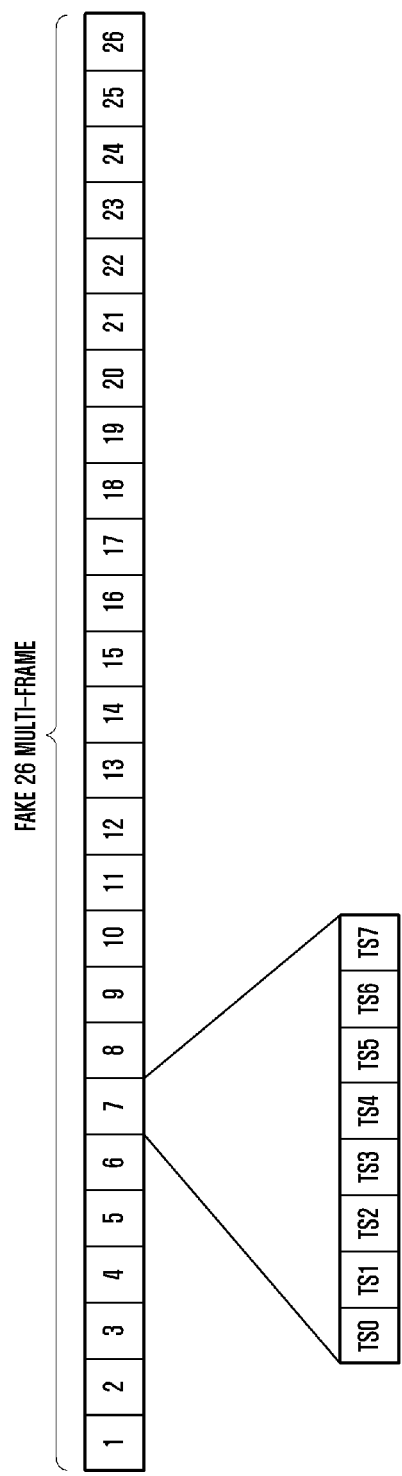

[Fig. 4b]
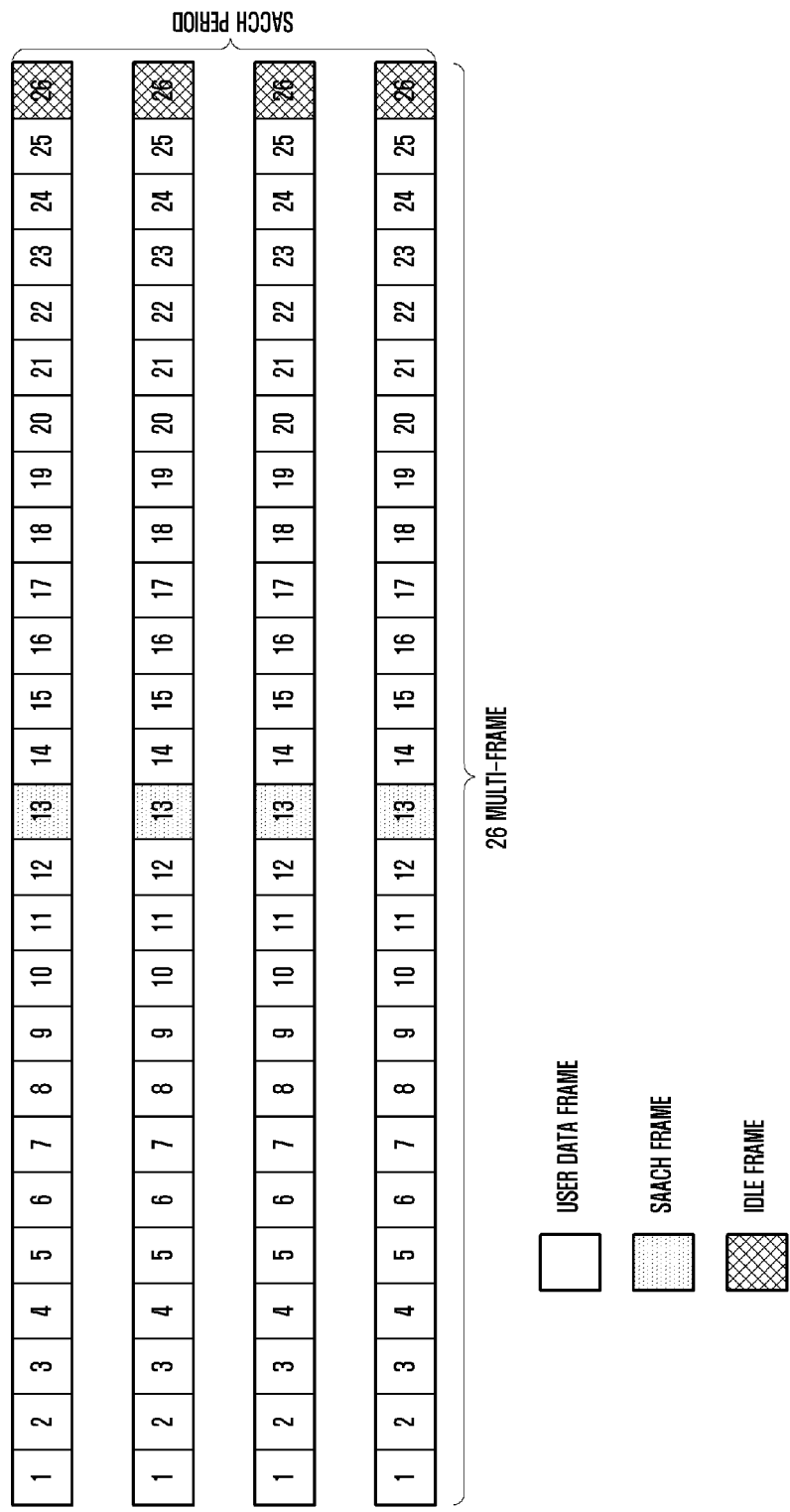

[Fig. 5]

| 8 | 7 | 6 | 5 | 4 | 3 | 2 | 1 | |
|---|---|---|---|---|---|---|---|---|
| Measurement Results IEI | | | | | | | | octet 1 |
| BA-USED | DTX USED | RXLEV-FULL-SERVING-CELL | | | | | | octet 2 |
| 3G-BA-USED | MEAS-VALID | RXLEV-SUB-SERVING-CELL | | | | | | octet 3 |
| Spare | RXQUAL-FULL SERVING-CELL | | | RXQUAL-SUB SERVING-CELL | | | NO-NCELL M (high part) | octet 4 |
| NO-NCELL-M (low part) | RXLEV-NCELL 1 | | | | | | | octet 5 |
| BCCH-FREQ-NCELL 1 | | | | | BSIC-NCELL 1 (high part) | | | octet 6 |
| BSIC-NCELL 1 (low part) | | | RXLEV-NCELL 2 (high part) | | | | | octet 7 |
| RXLEV NCELL 2 (low part) | BCCH-FREQ-NCELL 2 | | | | | BSIC-NCELL 2 (high part) | | octet 8 |
| BSIC-NCELL 2 (low part) | | | | RXLEV-NCELL 3 (high part) | | | | octet 9 |
| RXLEV-NCELL 3 (low part) | BCCH-FREQ-NCELL 3 | | | | | | BSIC-NCELL 3 (high part) | octet 10 |
| BSIC-NCELL 3 (low part) | | | | RXLEV-NCELL 4 (high part) | | | | octet 11 |
| RXLEV-NCELL 4 (low part) | BCCH-FREQ-NCELL 4 | | | | | | | octet 12 |
| BSIC-NCELL 4 | | | | | RXLEV-NCELL 5 (high part) | | | octet 13 |
| RXLEV-NCELL 5 (low part) | | | | BCCH-FREQ-NCELL 5 (high part) | | | | octet 14 |
| BCCH-FREQ-NCELL 5 (low part) | BSIC-NCELL 5 | | | | | | RXLEV NCELL 6 (high part) | octet 15 |
| RXLEV-NCELL 6 (low part) | | | | BCCH-FREQ-NCELL 6 (high part) | | | | octet 16 |
| BCCH-FREQ-NCELL 6 (low part) | BSIC-NCELL 6 | | | | | | | octet 17 |
| I_FLAG | TCH_INDEX | | | TCH_RXQUAL | | | | octet 18 |

[Fig. 6]

| 8 | 7 | 6 | 5 | 4 | 3 | 2 | 1 | |
|---|---|---|---|---|---|---|---|---|
| | Interference Measurement Results IEI | | | | | | | octet 1 |
| Length indicator | | | | | | Spare | | octet 2 |
| TCH_INDEX1 | | | | | | TCH_RXQUAL1 (high part) | | octet 3 |
| TCH_RXQUAL1 (low part) | | TCH_INDEX2 | | | | TCH_RXQUAL2 (high part) | | octet 4.... |
| TCH_INDEXk | | | | | | TCH_RXQUALk (high part) | | octet N-1 |
| TCH_RXQUALk (low part) | | Spare | | | | | | octet N |

[Fig. 7]

| 8 | 7 | 6 | 5 | 4 | 3 | 2 | 1 | |
|---|---|---|---|---|---|---|---|---|
| | Interference Measurement Results IEI | | | | | | | octet 1 |
| TCH_RXQUAL1 | | | TCH_RXQUAL2 | | | TCH_RXQUAL3 (high part) | | octet 2 |
| TCH_RXQUAL3 (low part) | TCH_RXQUAL4 | | | TCH_RXQUAL5 | | | TCH_RXQUAL6 (high part) | octet 3 |
| TCH_RXQUAL6 (low part) | TCH_RXQUAL7 | | | TCH_RXQUAL8 | | | | octet 4 ... |
| | | | | | | | | octet N-2 |
| | | | | | | | | octet N-1 |
| TCH_RXQUALM-2 (low part) | TCH_RXQUALM-1 | | | TCH_RXQUALM | | | | octet N |

[Fig. 8]
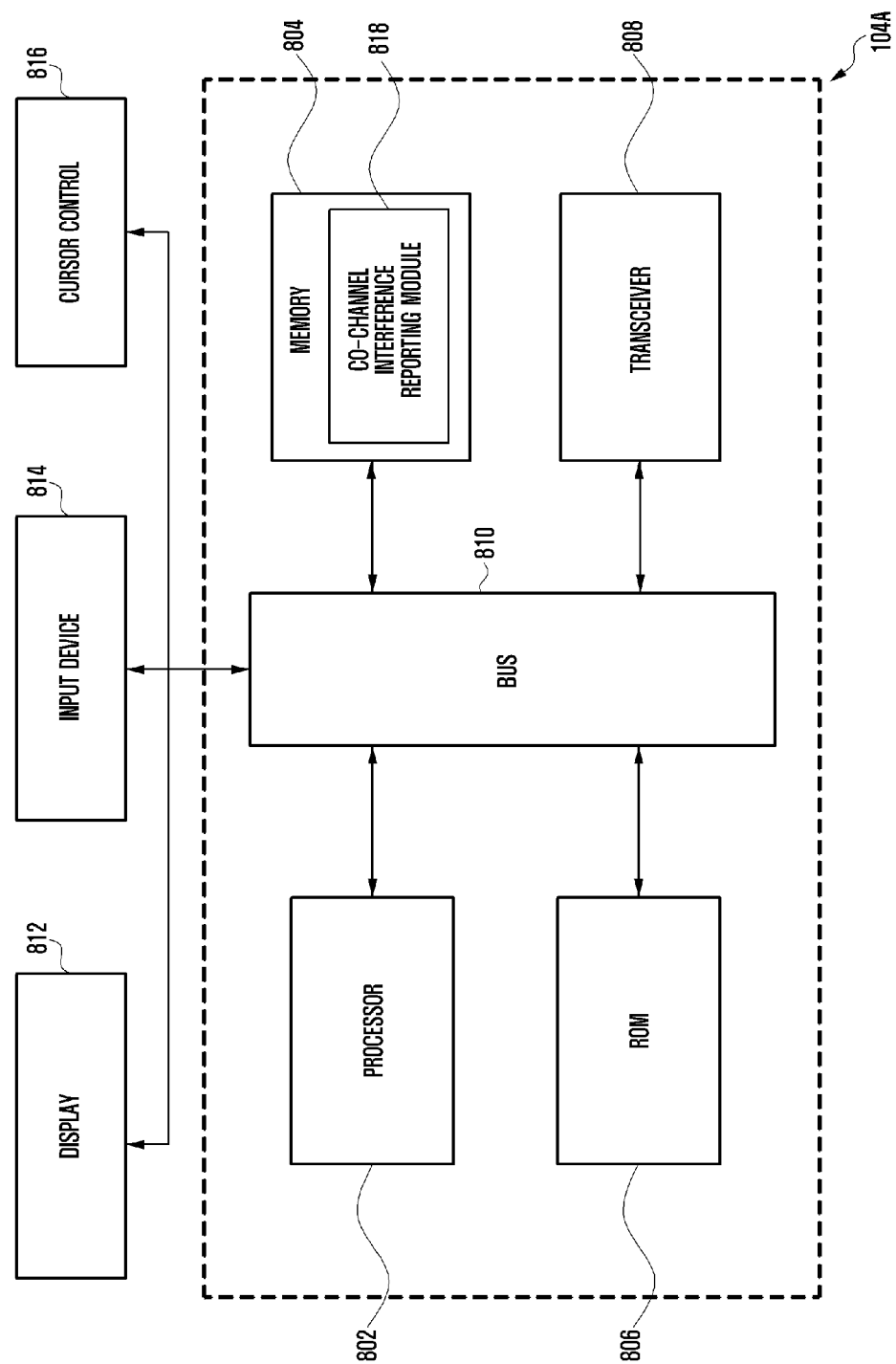

METHOD AND SYSTEM FOR MANAGING CO-CHANNEL INTERFERENCE ON A TRAFFIC CHANNEL

CROSS-REFERENCE TO RELATED APPLICATION(S)

The present application claims priority under 35 U.S.C. § 365 to International Patent Application No. PCT/KR2013/000103 filed Jan. 7, 2013, entitled "METHOD AND SYSTEM FOR MANAGING CO-CHANNEL INTERFERENCE ON A TRAFFIC CHANNEL". International Patent Application No. PCT/KR2013/000103 claims priority under 35 U.S.C. § 365 and/or 35 U.S.C. § 119(a) to Indian Patent Application No. 65/CHE/2012 filed Jan. 5, 2012 and which are incorporated herein by reference into the present disclosure as if fully set forth herein.

TECHNICAL FIELD

The present invention relates to the field of wireless communication systems, and more particularly relates to managing co-channel interference on a traffic channel.

BACKGROUND ART

Wireless communication networks are widely deployed to provide various communication services such as voice, packet data, broadcast, messaging, and so on. These wireless networks may be capable of supporting communication for multiple users by sharing available network resources. Examples of such wireless networks include Code Division Multiple Access (CDMA) networks, Time Division Multiple Access (TDMA) networks, and Frequency Division Multiple Access (FDMA) networks. These wireless networks may also utilize various radio access technologies (RATs) such as Wideband-CDMA (W-CDMA), cdma2000, Global System for Mobile Communications (GSM), Long Term Evolution (LTE), and so on.

In a wireless network such as CDMA network, base stations use same resources (e.g., time slots, frequency, etc.) on a traffic channel to communicate with user equipments. Due to multiple uses of the same resources, co-channel interference may occur in which data carried on one carrier in a first cell interferes with another carrier of the same frequency/time slot in a second cell. Consequently, user equipments may experience a poor quality of service from respective base stations.

DISCLOSURE OF INVENTION

Solution to Problem

A method for managing co-channel interference on a traffic channel (TCH) in a wireless network environment according to an embodiment of the present invention comprises receiving scrambling code transmitted by at least one neighbouring cell on a traffic channel in at least one search frame, descrambling the scrambling code received from the at least one neighbouring cell on the traffic channel, evaluating signal strength of the at least one neighbouring cell based on the output of descrambled scrambling code, determining whether there is a co-channel interference from the at least one neighbouring cell based on the evaluated signal strength and reporting existence of the co-channel interference from the at least one neighbouring cell to a serving cell based on the determination.

BRIEF DESCRIPTION OF DRAWINGS

FIG. 1 illustrates a block diagram of a wireless network system, in the context of the invention.

FIG. 2 is a process flowchart illustrating an exemplary method of reporting co-channel interference from one or more neighbouring cells on a traffic channel (TCH), according to one embodiment.

FIG. 3 is a process flowchart illustrating an exemplary method of mitigating co-channel interference on a traffic channel, according to another embodiment.

FIG. 4a is a schematic representation illustrating a fake 26 multi-frame used for transmitting a list of scrambling codes.

FIG. 4b is a schematic representation illustrating a slow associated control channel (SACCH) period including four idle frames for performing co-channel interference measurements.

FIG. 5 is a schematic diagram illustrating a measurement report message format for reporting co-channel interference on a traffic channel, according to one embodiment.

FIG. 6 is a schematic diagram illustrating an interference measurement result message format for reporting co-channel interference on multiple ARFCNs allocated in a traffic channel, according to one embodiment.

FIG. 7 is a schematic diagram illustrating an interference measurement result message format for reporting co-channel interference on multiple ARFCNs allocated in a traffic channel, according to another embodiment.

FIG. 8 is a block diagram of an user equipment, such as those shown in FIG. 1, showing various components for implementing embodiments of the present subject matter.

The drawings described herein are for illustration purposes only and are not intended to limit the scope of the present disclosure in any way.

MODE FOR THE INVENTION

The present invention provides a method and system for managing co-channel interference on a traffic channel. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms 'base station' and 'cell' means the same are used interchangeably throughout the document.

FIG. 1 illustrates a block diagram of a wireless network system 100, in the context of the invention. In FIG. 1, the wireless network system 100 includes a plurality of cells 102A-C located adjacent to each other in a geographical area, a plurality of user equipments 104A-C and a network entity 106. Each of the cells 102A-C serves one or more user equipments located within a network coverage area of the respective cells 102A-C. For example, the cell 102A is serving the user equipment 104A while the cell 102B is serving the user equipment 104B. The user equipments 104A-C may be wireless transmit and receive units (WTRU) such as a tablet computer, a cell phone, and so on. The network entity 106 may be a logical or physical entity residing in a core network.

Each of the cells 102A-C may use same resources (time slots, ARFCN, etc.) associated with a traffic channel to communication with the user equipments 104A-C in their respective network coverage area. Alternatively, the cells 102A-C may use different resources (timeslots, ARFCNs, etc.) associated with a traffic channel to communicate with the user equipments 104A-C in their respective network coverage area. A co-channel interference may exist on a traffic channel when the cells 102A-C use same resources associated with the traffic channel. The present invention provides a method for handling co-channel interference from neighbouring cells on a traffic channel in a manner described below.

FIG. 2 is a process flowchart 200 illustrating an exemplary method of reporting co-channel interference from one or more neighbouring cells 102B and 102C on a traffic channel (TCH), according to one embodiment. At step 202, a list of scrambling codes (or CDMA code or Pseudo noise sequence) associated with one or more neighbouring cells 102B and 102C is received from a serving base station 102A. In some embodiments, the serving cell 102A may transmit a list of scrambling codes associated with the cells 102A-C.

During the connected mode of the user equipment 104A, the scrambling codes in the list are transmitted from the neighbouring cells 102B and C continuously in a special multi-frame such as shown in FIG. 4a. In one of the embodiments, these transmissions can be similar to the legacy 26 multi-frame structure. The cells 102A-C transmit the scrambling code in a multitude of time slots in each frame of the special multi-frame structure. For example, each of the cells 102A-C can transmit respective scrambling code in each TCH ARFCN on time slots TS0 and TS4 in each frame of the special multi-frame.

Consider that, a user equipment is assigned a dedicated traffic channel for data communication (e.g., voice call). Also, consider that a user equipment 104A is configured for measuring co-channel interference from one or more neighbouring cells 102B and 102C on a traffic channel used for communication between the base station 102A and the user equipment 104A. For measuring the co-channel interference, at step 204, co-channel interference measurements are performed on the traffic channel in at least one search frame. In some embodiments, the downlink co-channel interference measurements are performed when the serving cell 102A is not transmitting. For example, the serving cell 102A does not transmit data on a logical idle frame, and hence the user equipment 104A may perform co-channel interference measurements on the logical idle frames. In one exemplary implementation, the co-channel interference measurements are performed on a TCH Absolute Radio-Frequency Channel Number (ARFCN) in a logical idle frame of a 26 multi-frame structure. The TCH ARFCN is a unique number given to a traffic channel allocated to the user equipment 104A. It can be noted that, the TCH ARFCN on which the co-channel interference is measured is same as the TCH ARFCN allocated for data communication on the traffic channel. For example, the co-channel interference measurements are performed in a slow associated control channel (SACCH) period. A SACCH period contains four 26 multi-frame structure, each 26 multi-frame structure has 24 frames reserved for user data, one idle frame ($26^{th}$ frame), and one SACCH frame ($13^{th}$ frame). In some implementations, two out of four logical idle frames may be dedicated for performing co-channel interference measurements. Exemplary SAACH period containing four 26 multi-frames is shown in FIG. 4b.

At step 206, it is determined whether any scrambling code is received from the one or more neighbouring cells 102B and 102C on the TCH ARFCN in the search frame. If the scrambling code is received on the TCH ARFCN in the search frame, then at step 208, the received scrambling code is descrambled. At step 209, signal strength of the one or more neighbouring cells 102B and 102C is evaluated based on the output of the descrambled scrambling code. In one embodiment, a scrambling code obtained from the list of scrambling codes is multiplied with each symbol of the scrambling code received in the search frame. In this embodiment, a sum of the product of the scrambling code and said each symbol of the received scrambling code is computed. The sum of the product of the scrambling code and said each symbol is a measure of signal strength (i.e., received signal strength indication (RSSI)) of respective neighbouring cell which transmitted the scrambling code on the TCH ARFCN in the search frame. For example, if no co-channel interference exists from a neighbouring cell on the TCH ARFCN, then the value of the sum would be approximately equal to zero.

At step 210, it is determined whether the signal strength associated with each of the neighbouring cells 102B and 102C is greater than threshold signal strength. The threshold signal strength may be equal to a signal strength value that would cause co-channel interference from the one or more neighbouring cells 102B and 102C. If the signal strength is equal to or greater than the threshold signal strength, then it implies that co-channel interference exists from the one or more neighbouring cell on the traffic channel. If the signal strength is less than the threshold signal strength, then it implies that there exists no co-channel interference from the one or more neighbouring cells 102B and 102C on the traffic channel.

If the user equipment 104A is affected by the co-channel interference from any of the neighbouring cells 102B and 102C, at step 212, the existence of co-channel interference on the traffic channel from the one or more neighbouring cells 102B and 102C is reported to the serving cell 102A. In one exemplary implementation, the level of co-channel interference (e.g., carrier to interference ratio) is also reported to the serving cell 102A. In some embodiments, the existence of co-channel interference on the traffic channel and level of co-channel interference is reported to the serving cell 102A on a SACCH frame of a 26 multi-frame. Exemplary a measurement report message for reporting co-existence interference from the one or more neighbouring cells on the traffic channel is illustrated in FIG. 5.

Referring to FIG. 5, the measurement report message contains various fields including received signal strength indication (RSSI) of the serving cell 102A on the traffic channel (RXLEV_FULL and RXLEV_SUB), reception quality associated with the serving cell on the traffic channel (RXQUAL_FULL and RXQUAL_SUB), number of neighbouring cells (NO-NCELL) in vicinity of the user equipment 104A, broadcast control channel frequency of each neighbouring cell (BCCH-FREQ-NCELL), base station identity code of each neighbouring cell (BSIC-NCELL), received signal strength indication (RSSI) of each neighbouring cell on the traffic channel (RXLEV_NCELL), traffic channel index (TCH_INDEX), and reception quality on the traffic channel (TCH_RXQUAL). The user equipment 104A may set value in the above fields in the measurement report message based on the sensed signal data on the TCH ARFCN in the search frame and transmit the measurement report message to the serving cell 102A to report co-channel interference on the traffic channel. It can be noted that, the user equipment 104A can transmit the measurement report message periodically to the serving cell 102A over a fast associated control channel (FACCH) or slow associated control channel (SACCH). The serving cell 102A may indicate whether the user equipment 104A needs to transmit the measurement report message in the FACCH or SACCH. Also, the serving cell 102A may indicate periodicity for transmitting the measurement report message by the user equipment 104A in system information message transmitted on a broadcast control channel (BCCH). Alternatively, the user equipment 104A may send the measurement report message to the serving cell 102A when the co-channel interference on the associated traffic channel is detected.

It is understood that, more than one ARFCN can be allocated in the traffic channel. In such case, the user equipment 104A performs co-channel interference from neighbouring cells 102B and 102C on all ARFCNs allocated to the user equipment 104A on the traffic channel. Further, the user equipment 104A reports co-channel interference parameters in an interference measurement results message as indicated in FIG. 6. Referring to FIG. 6, the interference measurement results message includes a traffic channel index field and reception quality (RXQUAL) of the traffic channel field for each ARFCN configured for the traffic channel for indicating co-channel interference associated with each ARFCN allocated in the traffic channel. Alternatively, the user equipment 104A reports co-channel interference parameters in an interference measurement results message illustrated in FIG. 7. In FIG. 7, the interference results message includes fields for indicating reception quality (RXQUAL) of the traffic channel field for each ARFCN configured for the traffic channel for indicating co-channel interference associated with each ARFCN allocated in the traffic channel.

FIG. 3 is a process flowchart 300 illustrating an exemplary method of mitigating co-channel interference on a traffic channel, according to another embodiment. At step 302, a measurement report indicating existence of co-channel interference is periodically received from each of the base stations 102A-C by the network entity 106. The measurement report may contain various parameters such as RSSI measured on a TCH ARFCN of a neighbouring cell, RSSI of a TCH channel (RX_LEV), reception quality of assigned TCH channel (RX_QUAL), and respective base station identity code. The parameters RX_LEV and RX_QUAL are further divided into RX_LEV_FULL, RX_LEV_SUB, RX_QUAL_FULL, and RX_QUAL_SUB. The parameters RX_LEV_SUB and RX_QUAL_SUB indicate the RSSI and reception quality measured on subset frames (e.g., frames which carry data).

At step 304, parameters associated with the co-channel interference corresponding to a TCH ARFCN associated with each base station are stored in a database. Exemplary database is shown in a table 1 below in which different values of RXQUAL or carrier to interference ratio measured for each TCH ARFCN is maintained for each of the base stations.

TABLE 1

|  | BS 102A | BS 102B | BS 102C |
| --- | --- | --- | --- |
| ARFCN 1 | X | 0Xff | Y |
| ARFCN 2 | 0 | Z | 0xFF |
| ARFCN 3 | 0xFF | 0 | 0xFF |

TABLE 1-continued

|  | BS 102A | BS 102B | BS 102C |
| --- | --- | --- | --- |
| ARFCN 4 | P | N | 0 |
| . |  |  |  |
| . |  |  |  |
| ARFCN N |  |  |  |

In the Table 1, 0xFF is considered as "Assumed as no data available".

At step 306, it is determined whether there exists co-channel interference for each ARFCN. If there exists co-channel interference, then at step 308, a solution to mitigate co-channel interference on a TCH ARFCN is provided to respective base station. For example, a base station may be instructed to vary transmit power or resources may be re-allocated to the base station to mitigate co-channel interference. In the example shown in Table 1, for the ARFCN 1, it is determined whether the value 'X' reported by the base station 102A is greater than the value 'Y' reported by the base station 102C. If 'X'>'Y', then the base station 102A may be instructed to increase the transmit power or resources such as time slots, TCH ARFCN, etc. can be reassigned to the base station 102A to mitigate the existing co-channel interference.

FIG. 8 is a block diagram of the user equipment 104A showing various components for implementing embodiments of the present subject matter. In FIG. 8, the user equipment 104A includes a processor 802, memory 804, a read only memory (ROM) 806, a transceiver 808, a bus 810, a display 812, an input device 814, and a cursor control 816.

The processor 802, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, and the like.

The memory 804 and the ROM 806 may be volatile memory and non-volatile memory. The memory 804 includes a co-channel interference reporting module 818 for measuring co-channel interference on a traffic channel from one or more neighbouring cells 102B and 102C and reporting the existence of the co-channel interference on the traffic channel to the serving cell 102A, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present subject matter may be implemented in conjunction with modules, including functions, procedures, data structures, and application programs, for performing tasks, or defining abstract data types or low-level hardware contexts. The co-channel interference reporting module 818 may be stored in the form of machine-readable instructions on any of the above-mentioned storage media and may be executable by the processor 802. For example, a computer program may include machine-readable instructions capable of measuring co-channel interference on a traffic channel from one or more neighbouring cells 102B and 102C and reporting the existence of the co-channel interference on the traffic channel to the serving cell 102A, according to the teachings and herein described embodiments of the present subject matter. In one embodiment, the computer program may be included on a compact disk-read only memory (CD-ROM) and loaded from the CD-ROM to a hard drive in the non-volatile memory.

The transceiver 808 may be capable of receiving scrambling code transmitted by one or more neighbouring cells 102B and 102C on at least one search frame of a traffic channel and transmitting a measurement report message to the serving cell 102A if co-channel interference on the traffic channel is detected. The bus 810 acts as interconnect between various components of the user equipment 104A. The components such as the display 812, the input device 814, and the cursor control 816 are well known to the person skilled in the art and hence the explanation is thereof omitted.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method for managing co-channel interference on a traffic channel (TCH) in a wireless network environment, the method comprising:
   receiving a list of scrambling codes associated with one or more neighbouring cells from a serving cell;
   receiving a scrambling code transmitted by at least one neighboring cell on a traffic channel in at least one search frame, when a serving cell is not transmitting data;
   descrambling the scrambling code received from the at least one neighboring cell on the traffic channel;
   evaluating a signal strength of the at least one neighboring cell based on an output of the descrambled scrambling code;
   determining whether there is a co-channel interference from the at least one neighboring cell based on the evaluated signal strength;
   reporting an existence of the co-channel interference from the at least one neighboring cell to a serving cell based on the determination; and
   based on the existence of the co-channel interference, mitigating the co-channel interference by increasing a transmit power or resources of traffic channels,
   wherein each scrambling code of each neighboring cell is transmitted in a same time slot as a time slot in which the serving cell transmits the scrambling code, and
   wherein the descrambling is an operation of multiplying each scrambling code obtained from the list of scrambling codes by the scrambling code received in the search frame.

2. The method of claim 1, further comprising:
   receiving a list of scrambling codes associated with a plurality of neighboring cells from the serving cell.

3. The method of claim 2, wherein evaluating the signal strength of the at least one neighboring cell comprises:
   obtaining a scrambling code associated with the at least one neighboring cell from a list of scrambling codes;
   multiplying the scrambling code associated with the at least one neighboring cell with each symbol of the received scrambling code; and
   computing a sum of multiplication products of the scrambling code and each symbol of the received scrambling code.

4. The method of claim 3, wherein the scrambling code associated with the at least one neighboring cell is received on an absolute radio-frequency channel number (ARFCN) allocated on the traffic channel in at least one idle frame.

5. The method of claim 4, wherein the ARFCN in the at least one idle frame is same as an ARFCN allocated for data communication.

6. The method of claim 1, wherein determining whether there is the co-channel interference from the at least one neighboring cell based on the evaluated signal strength comprises:
   determining whether the signal strength associated with the at least one neighboring cell is greater than a threshold signal strength.

7. The method of claim 6, wherein reporting the existence of the co-channel interference from the at least one neighboring cell to the serving cell comprises:
   reporting the existence of the co-channel interference from the at least one neighboring cell to the serving cell in at least one slow associated control channel (SACCH) frame of a SACCH period.

8. The method of claim 6, wherein receiving the scrambling code from the at least one neighboring cell on the traffic channel in the at least one search frame comprises:
   receiving the scrambling code from the at least one neighboring cell on the traffic channel in the at least one search frame in a 26 multi-frame of a slow associated control channel (SACCH) period.

9. The method of claim 7, wherein the at least one search frame is an idle frame.

10. An apparatus comprising:
    a non-transitory memory for storing program code for a co-channel interference reporting module; and
    a processor coupled to the memory, the processor to control to:
       receive a list of scrambling codes associated with one or more neighbouring cells from a serving cell;
       receive a scrambling code transmitted by at least one neighboring cell on a traffic channel in at least one search frame, when a serving cell is not transmitting data;
       descramble the scrambling code received from the at least one neighboring cell on the traffic channel;
       evaluate signal strength of the at least one neighboring cell based on an output of the descrambled scrambling code;
       determine whether there is a co-channel interference from the at least one neighboring cell based on the evaluated signal strength;

report an existence of the co-channel interference from the at least one neighboring cell to a serving cell; and based on the existence of the co-channel interference, mitigating a co-channel interference by increasing a transmit power or resources of traffic channels, wherein each scrambling code of each neighboring cell is transmitted in a same time slot as a time slot in which the serving cell transmits the scrambling code, and wherein the descrambling is an operation of multiplying each scrambling code obtained from the list of scrambling codes by the scrambling code received in the search frame.

11. The apparatus of claim 10, wherein the processor is further configured to execute the program code of the co-channel interference reporting module to control to receive a list of scrambling codes associated with a plurality of neighboring cells from the serving cell.

12. The apparatus of claim 11, wherein in evaluating the signal strength of the at least one neighboring cell, the processor is further configured to execute the program code of the co-channel interference reporting module to control to:

obtain a scrambling code associated with the at least one neighboring cell from a list of scrambling codes;

multiply the scrambling code associated with the at least one neighboring cell with each symbol of the received scrambling code; and compute a sum of multiplication products of the scrambling code and each symbol of the received scrambling code.

13. The apparatus of claim 12, wherein the scrambling code is received from the at least one neighboring cell on an absolute radio-frequency channel number (ARFCN) allocated on the traffic channel in at least one idle frame.

14. The apparatus of claim 13, wherein the ARFCN in the at least one idle frame is same as an ARFCN allocated for data communication.

15. The apparatus of claim 10, wherein in determining whether there is the co-channel interference from the at least one neighboring cell based on the evaluated signal strength, the processor is further configured to execute the program code of the co-channel interference reporting module to:

determine whether the signal strength of the at least one neighboring cell is greater than a threshold signal strength.

16. The apparatus of claim 15, wherein in reporting the existence of the co-channel interference from the at least one neighboring cell to the serving cell, the processor is further configured to execute the program code of the co-channel interference reporting module to control to:

report the existence of the co-channel interference from the at least one neighboring cell to the serving cell in at least one slow associated control channel (SACCH) frame of a SACCH period.

17. The apparatus of claim 15, wherein in receiving the scrambling code transmitted by the at least one neighboring cell on the at least one search frame, the processor is further configured to execute the program code of the co-channel interference reporting module to control to:

receiving the scrambling code transmitted by the at least one neighboring cell on at least one search frame in a 26 multi-frame of a slow associated control channel (SACCH) period.

18. The apparatus of claim 10, wherein the at least one search frame is an idle frame.

19. A system comprising:

a serving cell;

a plurality of neighboring cells; and at least one user equipment engaged in data communication with the serving cell, wherein the serving cell is configured to provide a list of scrambling codes associated with the plurality of neighboring cells to the at least one user equipment, wherein the plurality of neighboring cells are configured to transmit respective scrambling code in each frame of a multi-frame, wherein the at least one user equipment is configured to:

receive a list of scrambling codes associated with one or more neighbouring cells from a serving cell, receive a scrambling code transmitted by at least one of the plurality of neighboring cells on a traffic channel in at least one search frame, when a serving cell is not transmitting data, descramble the received scrambling code and evaluating signal strength of the at least one neighboring cell based on an output of the descrambled scrambling code, determine whether there is a co-channel interference from the at least one neighboring cell based on the evaluated signal strength, report an existence of the co-channel interference from the at least one neighboring cell to a serving cell, and based on the existence of the co-channel interference, mitigating the co-channel interference by increasing a transmit power or resources of traffic channels, wherein each scrambling code of each neighboring cell is transmitted in a same time slot as a time slot in which the serving cell transmits the scrambling code, and wherein the descrambling is an operation of multiplying each scrambling code obtained from the list of scrambling codes by the scrambling code received in the search frame.

20. The system of claim 19, wherein the at least one user equipment is configured to receive a list of scrambling codes associated with a plurality of neighboring cells from the serving cell.

* * * * *